United States Patent
Zhu et al.

(10) Patent No.: US 10,686,340 B2
(45) Date of Patent: Jun. 16, 2020

(54) INTERIOR PERMANENT MAGNET MOTOR

(71) Applicant: TRW Limited, Solihull, West Midlands (GB)

(72) Inventors: Zi-Qiang Zhu, Sheffield (GB); Jie Ma, Sheffield (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 16/211,315

(22) Filed: Dec. 6, 2018

(65) Prior Publication Data

US 2019/0173338 A1    Jun. 6, 2019

(30) Foreign Application Priority Data

Dec. 6, 2017  (GB) .................................. 1720367.0

(51) Int. Cl.
*H02K 1/27* (2006.01)
*H02K 29/03* (2006.01)

(52) U.S. Cl.
CPC ............. *H02K 1/276* (2013.01); *H02K 1/278* (2013.01); *H02K 29/03* (2013.01); *H02K 2213/03* (2013.01)

(58) Field of Classification Search
CPC ........ H02K 1/276; H02K 1/278; H02K 29/03; H02K 2213/03
(Continued)

(56) References Cited

U.S. PATENT DOCUMENTS

2002/0145353 A1 * 10/2002 Kimura .................. H02K 1/276
                                                              310/156.57
2003/0178905 A1    9/2003 Koharagi et al.
(Continued)

FOREIGN PATENT DOCUMENTS

CN    201805288 U    4/2011
EP      2026445 A2   2/2009
(Continued)

OTHER PUBLICATIONS

Patents Act 1977: Search Report, Application No. GB1720367.0, dated Jun. 5, 2018.

*Primary Examiner* — Thomas Truong
(74) *Attorney, Agent, or Firm* — MacMillian, Sobanski & Todd, LLC

(57) ABSTRACT

An interior permanent magnet motor comprising a rotor having a set of permanent magnets placed within the interior of the rotor and a stator which surrounds the rotor and has a set of stator teeth defining slots between adjacent teeth. The stator also includes a plurality of stator windings that extend around the teeth and within the slots, the rotor and stator defining an airgap there between, in which an outer peripheral surface of the rotor that faces the stator across the airgap is provided with a respective eccentric bulge in the region of each rotor magnet. The bulge has a part-elliptical shape, the centre of the circumference of the bulge lying on or close to an axis that passes through the axis of rotation of the rotor and through a point on or close to the circumferential centre of the associated magnet, and in which the two ends of the part-elliptical bulge respectively connect to a region of the periphery that interconnects to an adjacent bulge, in which the dimensions of the bulge are selected so as to optimise the motor in terms of minimising variations in cogging torque that arise due to geometric manufacturing errors.

5 Claims, 3 Drawing Sheets

(58) Field of Classification Search
USPC ............. 310/156.45, 156.48, 156.53, 156.56
See application file for complete search history.

(56) References Cited

U.S. PATENT DOCUMENTS

| | | | | |
|---|---|---|---|---|
| 2006/0131976 A1* | 6/2006 | Kikuchi | ................. | H02K 1/276 |
| | | | | 310/156.46 |
| 2007/0278886 A1* | 12/2007 | Fujiwara | ................ | H02K 1/276 |
| | | | | 310/156.53 |
| 2009/0115279 A1* | 5/2009 | Spaggiari | ............... | H02K 1/276 |
| | | | | 310/156.53 |
| 2015/0256038 A1* | 9/2015 | Nigo | ...................... | H02K 1/276 |
| | | | | 62/498 |

FOREIGN PATENT DOCUMENTS

| | | | |
|---|---|---|---|
| EP | 2995820 | A1 | 3/2016 |
| JP | 2002209350 | A | 7/2002 |
| JP | 2014103730 | A | 6/2014 |
| JP | 2014124092 | A | 7/2014 |
| WO | 2012046422 | A1 | 4/2012 |

* cited by examiner

INTERIOR PERMANENT MAGNET MOTOR

CROSS-REFERENCE TO RELATED APPLICATIONS

This application claims priority to Great Britain Patent Application No. 1720367.0, filed 6 Dec. 2017, the disclosures of which are incorporated herein by reference in entirety.

BACKGROUND TO THE INVENTION

This invention relates to improvements in electric motors, particularly radial interior permanent magnet motors.

Interior permanent magnet motors are well known. The basic design of a radial interior permanent magnet motor comprises a stator and a rotor that share a common axis. The stator has a number of stator teeth with the spaces between the teeth defining slots through which a set of stator windings pass as they wind around the teeth. These windings of electrically conductive wire are arranged in multiple electrical phases, typically three phases. The rotor comprises a number of permanent magnets which are located below the surface of the rotor periphery, i.e. interior to the rotor. The magnets alternate around the rotor between a North pole facing away from the rotor axis and a South pole facing away. The rotor is typically located inside the stator, so that the largest diameter of the rotor is slightly smaller than the smallest diameter of the stator, giving an air gap between the rotor and stator, so that the rotor is free to rotate.

In use, alternating drive currents are passed through the windings under control of a motor controller. These currents generate a magnetic flux which interacts with the magnets of the rotor, and by varying the currents in each winding as a function of the relative angular position of the rotor and the stator the magnetic flux will cause the rotor to turn to align the poles of the permanent magnets with the magnetic flux created by passing current through the coils. A wide range of control strategies are known, and the operation of such as motor forms a part of the common general knowledge of an expert in interior permanent magnet (PM) motors.

One known phenomenon exhibited by a motor of the kind described above is cogging torque. This is a torque ripple that occurs as the motor rotor rotates due to interaction between the rotor magnets and the stator teeth which are typically steel. The cogging torque is dependent on the position of the rotor. An interior permanent magnet motor having a rotor with an outer periphery of constant radius will exhibit a high degree of cogging torque. This is undesirable as it leads to a jerky movement of the rotor as it rotates, which is especially noticeable at low speeds and low drive currents.

The periodicity of the cogging torque depends on the number of magnets and the number of stator teeth. The lowest cogging torque order in a perfect motor, by which we mean a motor that is without manufacture tolerance, is determined by the least common multiple of rotor pole number, i.e. the number of magnets, and the number of teeth on the stator tooth, i.e.

$$N = LCM(2p, N_s)$$

where LCM is the lowest common multiple, 2p is the number of magnet poles and $N_s$ is the number of slots, equal to the number of teeth.

However, when manufacture error occurs, the lowest cogging torque order in one mechanical period cannot be calculated according to the equation above anymore. It has to be modified as $$N = LCM(N_{rotor}, N_{stator}) \quad (1)$$

where $N_{rotor}$ indicates the number of periodical parts of rotor and $N_{stator}$ represents the periodical parts of stator.

For example, a motor with 12 stator teeth and 8 rotor magnets having one tooth radially misaligned will suffer from $8^{th}$ order cogging torque. A similar motor with 3 stator and 4 rotor manufacturing errors will suffer from $12^{th}$ order cogging torque. The vast number of possible combinations of manufacturing errors such as deformation or offset of the teeth or poles, or the rotor and stator being out of round mean there can be relatively large variations in the harmonic content of the cogging torque even for small variations between motors of nominally the same dimensions.

SUMMARY OF THE INVENTION

A feature of the present invention is to ameliorate the inherent characteristic of an interior PM to exhibit cogging torque, and in particular to provide an arrangement which has good tolerance of geometric manufacturing errors with respect to the level of cogging torque observed.

According to a first aspect, the invention provides an interior permanent magnet motor comprising a rotor having a set of permanent magnets placed within the interior of the rotor and a stator which surrounds the rotor and has a set of stator teeth defining slots between adjacent teeth, the stator also including a plurality of stator windings that extend around the teeth and within the slots, the rotor and stator defining an airgap there between, in which an outer peripheral surface of the rotor that faces the stator across the airgap is provided with a respective eccentric bulge in the region of each rotor magnet, the bulge having a part-elliptical shape, the centre of the circumference of the bulge lying on or close to an axis that passes through the axis of rotation of the rotor and through a point on or close to the circumferential centre of the associated magnet, and in which the two ends of the part-elliptical bulge respectively connect to a region of the periphery that interconnects to an adjacent bulge, in which the dimensions of the bulge are selected so as to optimise the motor in terms of minimising variations in cogging torque that arise due to manufacturing tolerances.

The applicant has appreciated that the cogging torque can vary due to the deviations of the parts of the motor from the ideal due to manufacturing tolerances. These deviations are undesirable. For the first time, the applicant has appreciated that it is possible through use of an ellipse and through optimising the shape of the bulge it is possible minimise variations in cogging torque. Surprisingly the applicant has found that the choice of a part elliptical shape enables good optimisation to be achieved, in particular with respect to geometric variations caused by tolerances that include bending or twisting of the teeth of the stator, skewing of the rotor and both horizontal and vertical errors in the geometry of the stator teeth.

By part-elliptical we mean that the circumference of the bulge follows a path defined by an ellipse over substantially the whole of its length.

In a preferred arrangement the part ellipse may have a circumference that follows a path equal to approximately one half of a complete circumference of a whole ellipse which starts and ends at points on or close to the major axis of the complete ellipse.

In a preferred arrangement, the budge may be wider circumferentially than it is tall radially. In plan, the bulge appears though an ellipse has been pushed into the periphery of the rotor until it has sunken in half way, or less than halfway or more than half way.

The invention therefore provides an interior permanent magnet motor having a non-circular rotor that includes a number of optimised part-elliptic bulges. The applicant has determined that this shape provides a high degree of tolerance of motor manufacturing tolerances compared with other known rotor shapes which means it has a larger potential to achieve less sensitivity to manufacture error.

The regions of the peripheral surface of the rotor that interconnect two adjacent bulges may comprise planar surfaces, or may comprise curved surfaces of constant radius.

In a preferred arrangement, the part-ellipse may intersect with the minimum diameter of the rotor periphery before the inter-magnet web that joins the rotor periphery to the radially inward face of the magnets.

The length of the elliptical bulge along its major (longest) axis may be equal to the circumferential length of the magnet, or in a range between 0.9 times and 1.1 times the length of the magnet.

The part-elliptical bulge may have a ratio of long axis to short axis of between 5:1 and 8:1. This means it is wider circumferentially than it is high radially.

Additionally, the longest dimension of the ellipse may be at least as wide as the slot opening between teeth.

Most preferably the part-elliptical bulge has a long axis of between 14 mm and 15 mm and a short axis of between 2 mm and 2.5 mm where the magnets have a length of between 12 mm and 13 mm.

In one especially advantageous arrangement, the long axis—by which we mean the distance from one end of the bulge to the other around the circumference of the rotor—may be 14.4 mm and the length of the short axis of the ellipse that the semi-ellipse is derived from may be 2.2 mm, with a magnet circumferential width of 12.6 mm.

The rotor may have 8 permanent magnets and the stator may have 12 teeth defining 12 stator slots. It may have other numbers or magnets and other numbers of teeth. Each may be substantially identical and they may be spaced evenly around the outer peripheral part of the rotor below the surface of the rotor that faces the stator.

Each of the magnets may be located within a slot formed in the rotor. The rotor may comprise a laminated rotor made up of a set of layers or laminations, and the slots may pass through all or only a subset of the layers.

Other advantages of this invention will become apparent to those skilled in the art from the following detailed description of the preferred embodiments, when read in light of the accompanying drawings.

DETAILED DESCRIPTION OF THE INVENTION

Figure 1:
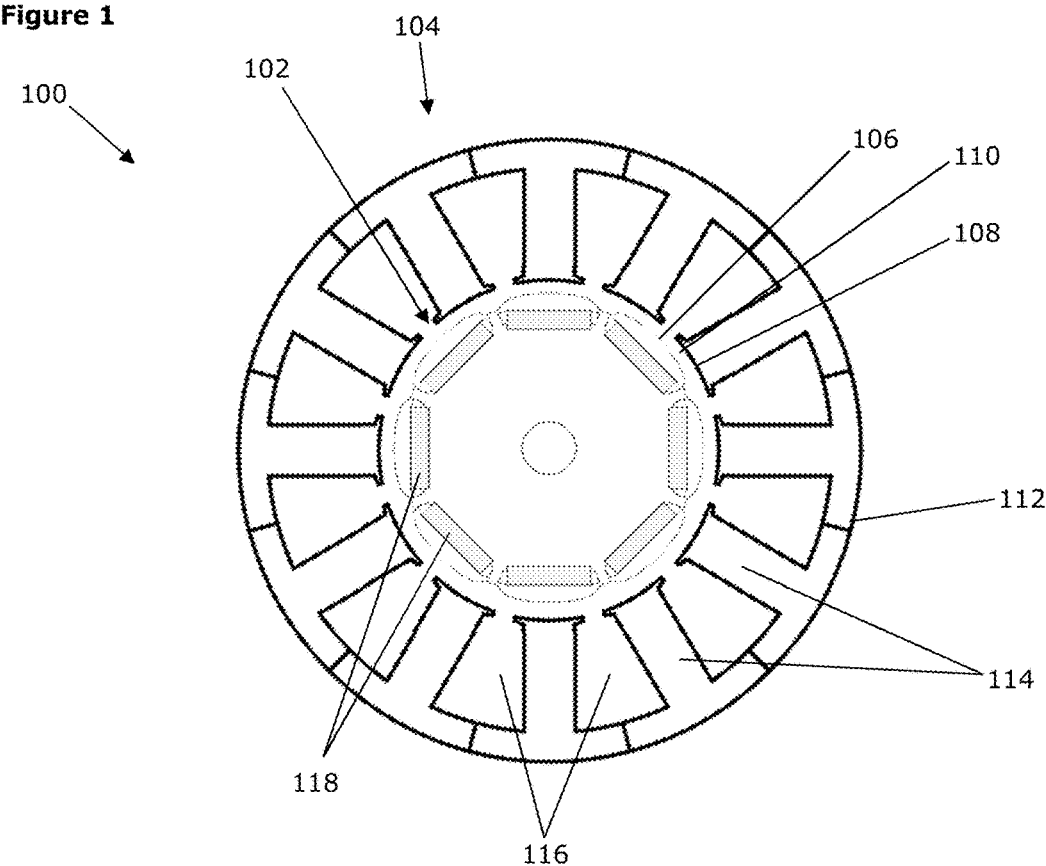
FIG. 1 is a plan view of an embodiment of an interior permanent magnet motor that falls within the scope of the present invention.

As shown in FIG. 1, an interior permanent magnet (PM) motor 100 comprises a rotor 102 and a stator 104, the rotor 102 having a smaller radius than the stator 104 and the two sharing a common axis of rotation. The rotor 102 defines an outer peripheral face 106 that faces away from the axis of rotation towards a similar, inwardly radially extending face 108 of the stator 104. An air gap 110 is defined between these two faces of the rotor 102 and the stator 104. The stator 104 is fixed in position and the rotor 102 is supported by bearings (not shown) so that it can rotate around the axis when in use.

The stator 104 comprises a steel support or back iron 112 and is shaped to define a set of 12 inwardly projecting teeth 114, with slots 116 being defined between adjacent teeth 114. A set of windings of copper wire (not shown) are wound through the slots 116 and around the teeth 114 in a defined pattern. The layout of the teeth 114 can be seen clearly in FIG. 2. Note that the ends of the teeth 114 that face the rotor 102 are curved so that all points of the end face are at the same radius from the axis of rotation of the motor rotor 102.

Figure 3:
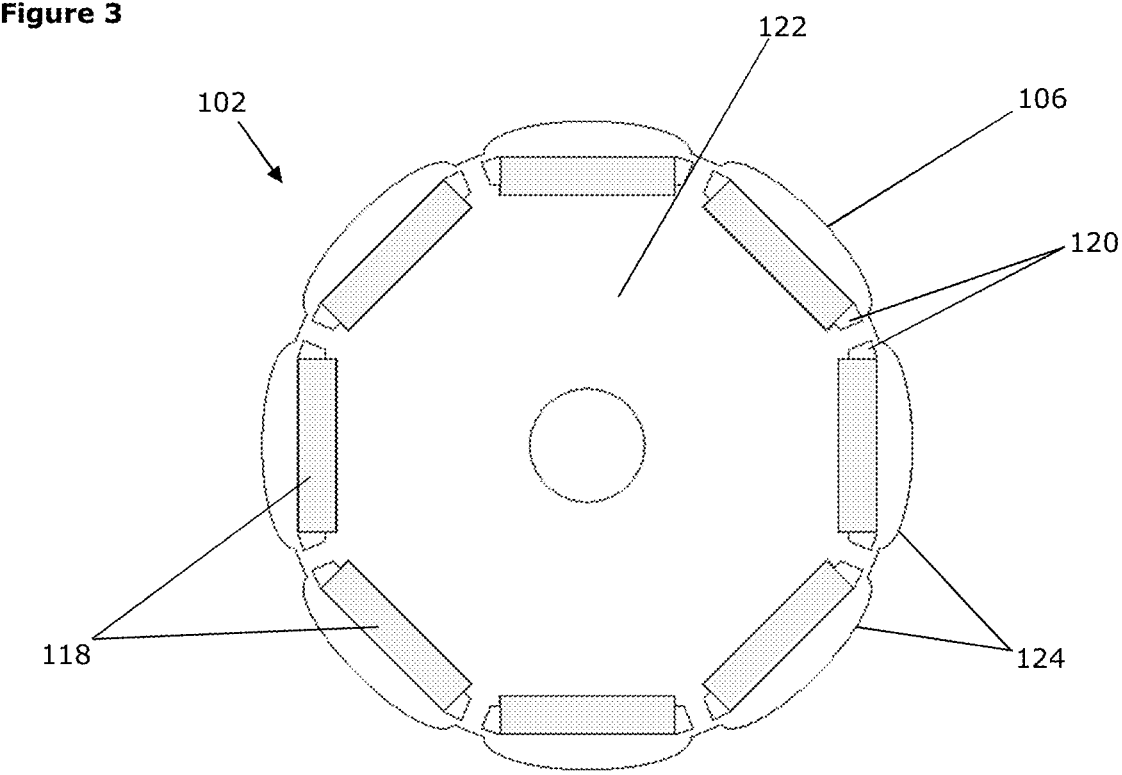
FIG. 3 is a plan view of the rotor showing the location of the rotor magnets inside the rotor.

The structure of the rotor 102 is shown in FIG. 3 in more detail. The rotor 102 comprises a laminated cylindrical core (not shown), made up of layers of metal sheet, which has a set of eight permanent magnets 118 inset into slots 120 cut into the core 122, so that the magnets 118 are supported a small distance below the peripheral surface 106. The magnets 118 are spaced evenly around the rotor 102, and alternate between North and South poles facing radially away from the axis of the rotor 102. This is beneficial compared with mounting the magnets 118 on the peripheral surface 106 of the rotor 102, in particular provides radial containment of the magnets 118 without additional components.

The peripheral surface 106 of the rotor 102 above each magnet 118 defines a part-elliptical bulge 124, in the example shown being exactly one half of an ellipse, with eight such bulges 124 in total spaced evenly around the rotor 102. The centre of the circumference of each bulge 124 lies on an axis that passes through the axis of rotation of the rotor 102 and through the circumferential centre of the associated magnet 118, and in which the two ends of the semi-elliptical bulge 124 respectively connect to a region of the periphery 106 that interconnects to an adjacent bulge 124.

Figure 2:
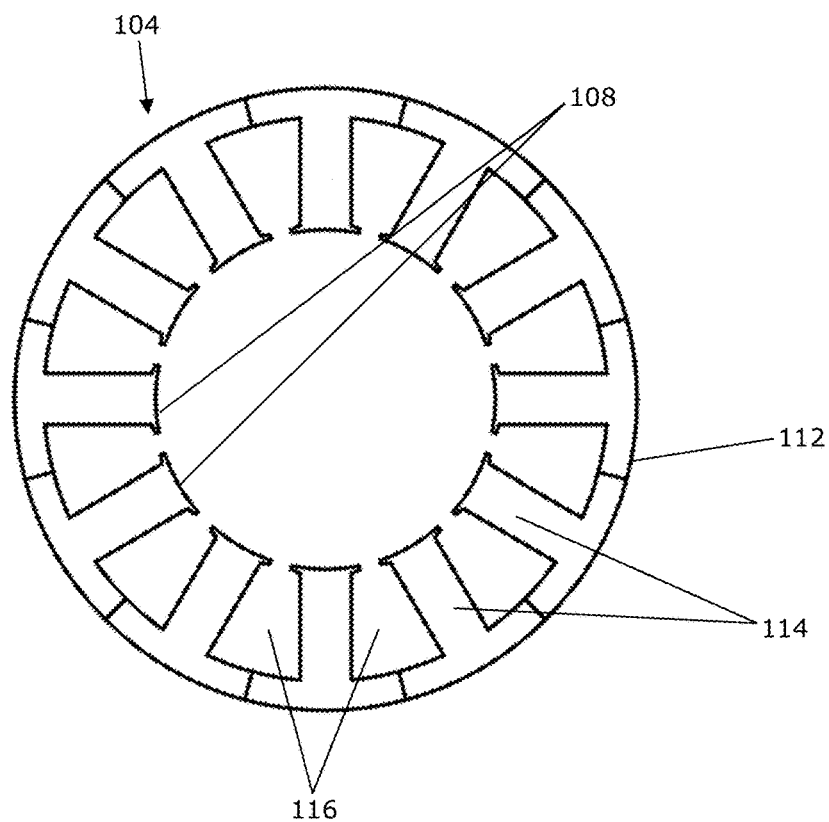
FIG. 2 is a plan view of the stator showing the stator teeth and slots.
Figure 4:
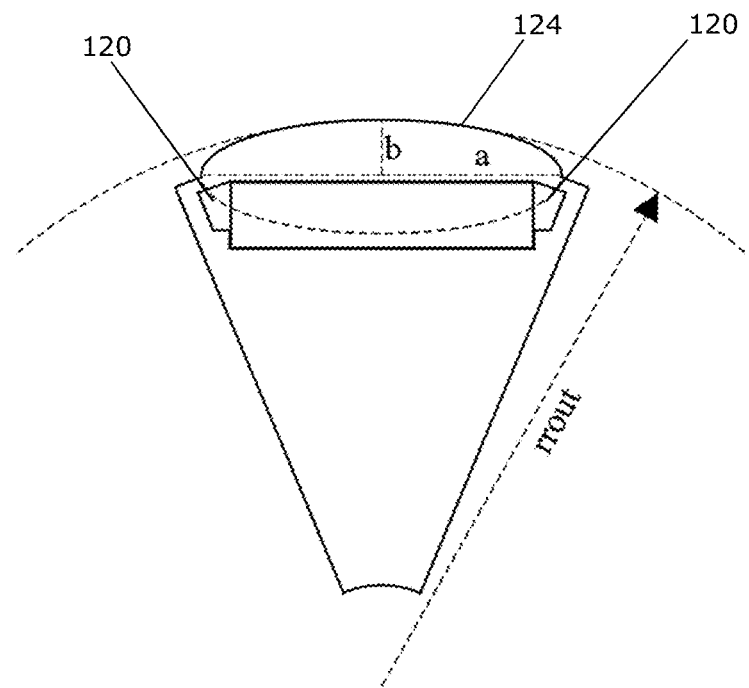
FIG. 4 is an enlarged plan view of a part of the rotor showing the proportions of a semi-elliptical bulge associated with each rotor magnet.

The air-gap function of the motor 100 shown in FIGS. 1 to 3 is defined as $$x = a \cdot \sin \theta$$

$$y = b \cdot \cos \theta + rrout - b \quad (2)$$

where $\theta$ is the angle of ellipse, x and y are the coordinate of ellipse, a and b are the width and height of ellipse, rrout indicates the maximum rotor radius. The ellipse centre depends on the minimum air-gap length as well as the height of ellipse, whose coordinate is (0,rrout−b). FIG. 4 shows clearly the variables a and b used in the above equation.

The applicant has determined that the selection of optimised part-elliptical shaped bulges 124 provide excellent flexibility compared with other rotor peripheral shapes in terms of insensitivity to geometric changes due to manufacturing errors in terms of the potential to be less sensitive to cogging torque.

Figure 5:
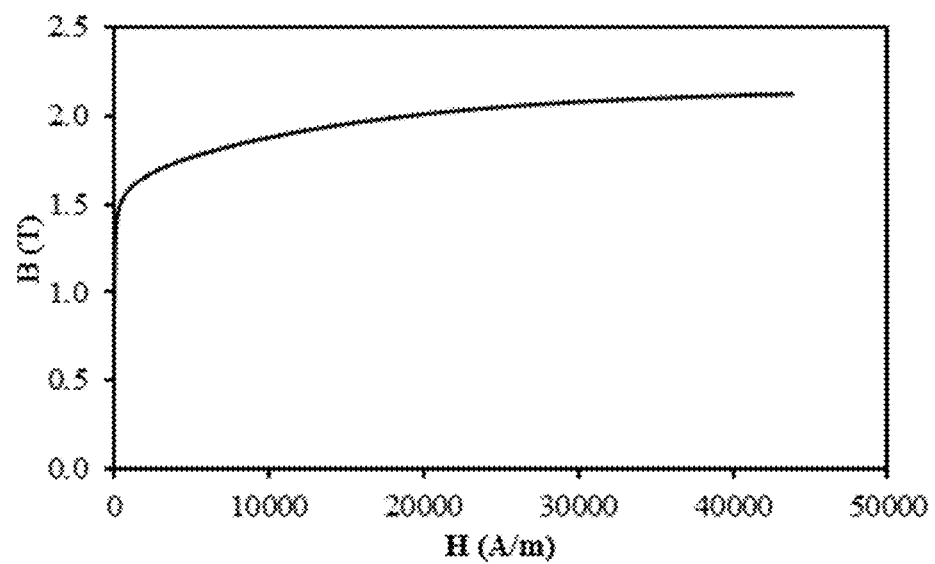
FIG. 5 is plot of the BH characteristics of the steel in an exemplary motor.

To test the performance of the semi-elliptical design, a motor was modelled in a simulation package having the properties set out in Table 1 below. In addition, the B-H characteristics of the lamination silicon steel is shown in FIG. 5. A range of different elliptical bulges were modelled. The applicant has realised that the cogging torque has positive correlation with the width of the part-elliptical bulge 124 but negative correlation with its height with the motor most insensitive to the manufacture error when a and b equals to 2.2 mm and 14.4 mm, respectively. In this example the minimum air gap was 0.6 mm.

Figure 6:
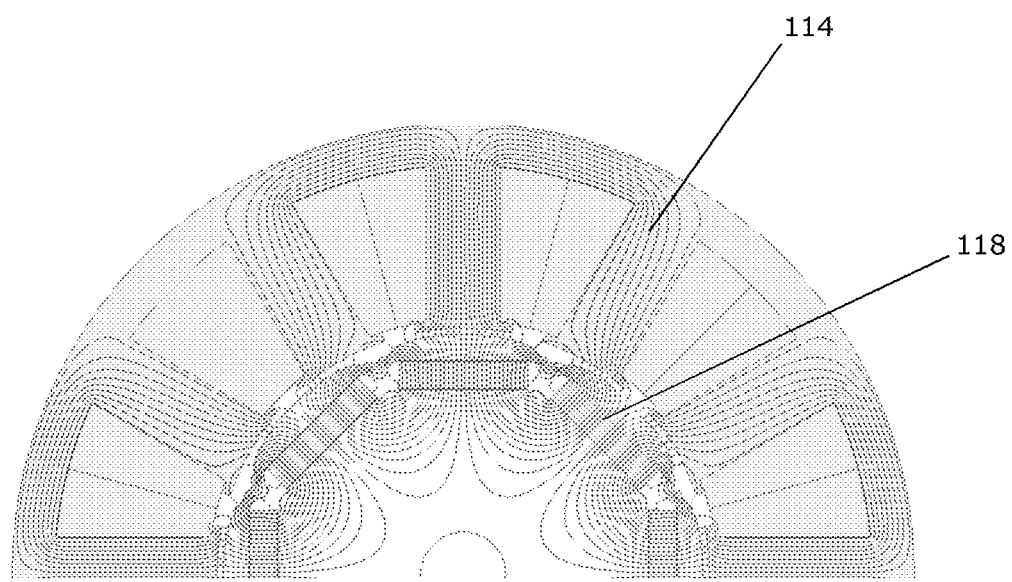
FIG. 6 shows the open circuit flux line distribution at the rotor position shown, and without current in the windings.

FIG. 6 shows the magnetic fields within the motor 100, and how the fields are concentrated in the air gap 110 by the bulges 124.

TABLE I

MAIN PARAMETERS OF EXEMPLARY IPM MOTOR

| | Variable | Value | Unit | | Variable | Value | Unit |
|---|---|---|---|---|---|---|---|
| Rotor | Number of poles | 8 | | Magnet | Axial length | 11.15 | mm |
| | Axial Length | 36 | mm | | Magnet Thickness (Radial) | 3.025 | mm |
| | Shaft (Diameter) | 6 | mm | | Magnet Width (Circumferential) | 12.59 | mm |
| | Magnet De-centre | 13.0 | mm | | Remanent Flux Density | 1.35 | T |
| | Rotor Diameter Max | 45.2 | mm | | Recoil Permeability | 1.05 | |
| | Rotor Diameter Min | 43.8 | mm | | | | |
| | Web Width | 1.5 | mm | Winding | Number of Turns (per Stator Segment) | 24 | |
| | Web Length | 1.65 | mm | | | | |
| | Bridge (Width) | 0.5 | mm | | | | |
| | Magnet Cavity Height (Radial) | 3.1 | mm | | Number of Parallel Branches (per Phase) | 4 | |
| | Magnet Cavity Width (Circumferential) | 12.64 | mm | | Wire diameter (bare copper) | 1.2 | mm |
| Stator | Number of Slots | 12 | | Others | Rotor Pucks Skewed Angle | 5.4 | Mech. Deg. |
| | Axial Length | 36 | mm | | Number of Pucks | 3 | |
| | Stator Outer Diameter | 85 | mm | | Lamination Material | Steel | |
| | Inner Bore Diameter | 46.4 | mm | | | | |
| | Tooth Width | 7 | mm | | | | |
| | Tooth Tip Gap | 3 | mm | | | | |
| | Tooth Tip Thickness | 0.5 | mm | | | | |
| | Tooth Angle | 110 | mm | | | | |

In accordance with the provisions of the patent statutes, the principle and mode of operation of this invention have been explained and illustrated in its preferred embodiments. However, it must be understood that this invention may be practiced otherwise than as specifically explained.

What is claimed is:

1. An interior permanent magnet motor comprising: a rotor having a set of permanent ma,nets placed within the interior of the rotor and a stator which surrounds the rotor and has a set of stator teeth defining slots between adjacent teeth, the stator also including a plurality of stator windings that extend around the teeth and within the slots, the rotor and stator defining an airgap there between, in which an outer peripheral surface of the rotor that faces the stator across the airgap is provided with a respective eccentric bulge in a region of each rotor magnet, the bulge having a part-elliptical shape, the centre of a circumference of the bulge lying on or close to an axis that passes through an axis of rotation of the rotor and through a point on or close to a circumferential centre of the associated magnet, and in which two ends of the bulge respectively connect to a region of a periphery that interconnects to an adjacent bulge, in which dimensions of the bulge are selected so as to optimise the motor in terms of minimising variations in cogging torque that arise due to geometric manufacturing errors, and in which the bulge has a ratio of long axis to short axis of between 5:1 and 8:1.

2. The interior permanent magnet motor according to claim 1 in which the bulge follows a path corresponding to substantially a half of an ellipse.

3. The interior permanent magnet motor according to claim 1 in which a length of the bulge along a major axis thereof is equal to a circumferential length of the magnet, or in a range between 0.9 times and 1.1 times the length of the magnet.

4. The interior permanent magnet motor according to claim 1 in which the part elliptical shape has a circumferential width of between 14 mm and 15 mm and a radial height of between 2 mm and 2.5 mm and in which the magnets have a length of between 12 mm and 13 mm.

5. The interior permanent magnet motor according to claim 1 in which the rotor has 8 permanent magnets and the stator has 12 teeth.

\* \* \* \* \*